United States Patent

[11] 3,617,544

| [72] | Inventors | Norbert Arthur Voss<br>Ridgewood, N.J.;<br>Durando Miller, Mount Kisco, N.Y. |
|---|---|---|
| [21] | Appl. No. | 36,356 |
| [22] | Filed | May 11, 1970 |
| [45] | Patented | Nov. 2, 1971 |
| [73] | Assignee | Sybron Corporation<br>Rochester, N.Y. |

[54] HOT PROCESS SETTLING TANK HAVING ADJUSTABLE DOWNCOMER
12 Claims, 3 Drawing Figs.

[52] U.S. Cl. .................................................. 210/20,
210/121, 210/177, 210/207, 210/261
[51] Int. Cl. .................................................. C02b 1/22
[50] Field of Search .................................................. 210/20,
121, 205, 207, 175, 177, 261

[56] References Cited
UNITED STATES PATENTS

| 2,378,799 | 6/1945 | Sebald | 210/207 X |
| 2,860,786 | 11/1958 | Kittredge | 210/207 X |
| 2,917,176 | 4/1968 | Bowers | 210/180 |
| 3,375,930 | 4/1968 | Applebaum | 210/207 |
| 3,393,804 | 7/1968 | Miller et al. | 210/177 |

*Primary Examiner*—Michael Rogers
*Attorney*—Theodore B. Roessel

ABSTRACT: A hot process eater softener is provided with an adjustable member to provide means for extending or shortening the downcomer pipe. The adjustable member controls the point of discharge of treated water passing from the downcomer pipe into the lower settling compartment surrounding the downcomer and can be made responsive to the water level in the upper reaction compartment.

PATENTED NOV 2 1971 3,617,544

INVENTORS
NORBERT ARTHUR VOSS
DURANDO MILLER

BY Theodore B Roensel

ATTORNEY

3,617,544

HOT PROCESS SETTLING TANK HAVING ADJUSTABLE DOWNCOMER

BACKGROUND OF THE INVENTION

This invention relates to an improved hot process water softener, and in particular, to an adjustable member and means for extending the length of the downcomer in a hot process settling tank. It is well known that the reaction involving the chemical softening of water takes place more rapidly and effectively in boiling water. As a result several types of hot process water softeners have been developed for the softening of water wherein the raw water is heated to near boiling temperature before it contacts the softening chemicals. Precipitation of the hardness elements, calcium and magnesium, then takes place most efficiently with a resulting effluent water that is low in hardness.

One type of hot process water softener and settling tank comprises an upper reaction compartment shaped like a funnel enclosed in an outer shell. The downcomer of the funnel extends into the lower regions of the vessel formed by the outer shell. The shape of the outer shell in the lower region of the tank may be conical, or angularly disposed baffles in the shape of a cone may be disposed in the lower region of the outer shell. In any case, most of the prior art teaches a conical-shaped compartment in which the sludge blanket accumulates.

Conical bottoms are used to gradually increase the cross sectional area of the upflow zone so that the rate of upflow is decreased gradually. This decreasing rate of upflow aids in forming the precipitates into a suspended sludge blanket, a portion of which is periodically removed from the sedimentation through a bottom located outlet. The precipitated solids which exit from the downcomer, move toward the conical bottom of the tank where they form the sludge blanket which is maintained in suspension by the upward flow of the treated water which also exits through the downcomer. The downcomer extends into the accumulated sludge blanket. As the treated water flows though this sludge blanket most of its turbidity is trapped in the suspended sludge and removed. The effluent water continues in an upward flow in a lower compartment and the clarified water exits from the tank through a collector in the upper region of the lower compartment. The softened water passing from the exit can be further treated in a downflow filter and/or ion exchangers to achieve the degree of purity desired.

In U.S. Pat. No. 3,393,804, Miller et al. teach a hot process settling tank having a spherical outer shell and an upwardly diverging baffle within the lower portion of the spherical shell forming the base of the lower settling compartment. The baffle is adapted to receive and direct the downflow of the treated water which exits from the downcomer, the treated water flowing upwardly through the lower settling compartment at a diminishing rate of flow.

In U.S. Pat. No. 2,917,176, Bowers teaches a hot process water softener having a secondary deaeration stage to provide a greater degree of oxygen removal or deaeration then provided by the hot process water softener having a single stage spraying and heating of the water. Bowers teaches a tank having a top and a conical bottom and having a conical partition continuing in a downcomer pipe which extends into the bottom of the tank. The conical partition divides the tank into an upper reaction compartment and a lower sedimentation compartment. The outlet flume is attached to the underside of the conical partition.

In U.S. Pat. No. 3,375,930, Applebaum teaches a water treatment apparatus of the upflow sludge blanket type comprising a tank having a bottom portion with an upwardly diverging wall to provide a region of upwardly increasing horizontal cross section, a funnel shaped upper reaction compartment having a downcomer which extends into the lower regions of the tank, a baffle assembly located below the lower end of the downcomer and a vertical pipe connected to the region above the vertex of the cone portion of the baffle with the connection terminating in the lower portion of the tank. A valve in the vertical pipe may be variably opened and closed by a stem arrangement extending through the wall of the tank. By adjustment of the valve opening, the flow of water through the vertical pipe connection may be controlled, the flow resulting from the approach velocity of the water leaving the lower end of the downcomer.

The above hot process water softeners are subject to one particular operational problem relating to the sensitivity to flow rates and velocities within the apparatus. This problem was recognized by Applebaum in U.S. Pat. No. 3,375,930, and the baffle assembly and the vertical pipe connection disclosed by Applebaum are attempts to do away with this problem. Applebaum teaches that proper operation through wide variations of flow rate would necessitate changes in the relative position of the lower end of the downcomer and the baffle assembly in relation to the bottom of the conical shaped tank. Applebaum found that such mechanical adjustment was quite impractical.

Most of the hot process water softeners are so designed that at maximum flow the sludge blanket is maintained at a proper considerable thickness to secure the desired length of flow path of the water through the blanket so that as the water leaves the blanket, the desired reactions are completed as are also the filtering effects. However, if the flow rate drops substantially the upward velocity of the water will not be sufficient to maintain the vertical extension of the blanket, and the sludge tends to concentrate in the lower portion of the conical-shaped tank. If the flow rate becomes too low, the sludge blanket may extend little above the lower end of the downcomer to become quite ineffective.

OBJECTS OF THE INVENTION

Accordingly, it is the main object of this invention to provide a vertically movable conduit at the lower end of the downcomer in a hot process water treatment settling tank.

It is another object of this invention to provide improved control of water velocities from the upper reaction compartment to the lower settling compartment of a hot process water softener.

It is still another object of this invention to provide a device responsive to changes in water levels in the upper reaction compartment of a hot process settling tank for controlling water velocities from the upper reaction compartment into the sludge blanket of a hot process water softener.

It is still another object of this invention to provide an apparatus and method for maintaining an expanded sludge blanket in the lower settling compartment so that the sludge blanket is sufficiently thick to effectively remove precipitated solids and provide clarified water.

Other objects and advantages of this invention will become apparent from the following detailed description taken in connection with the accompanying drawings.

SUMMARY OF THE INVENTION

By this invention and contrary to the prior art teaching, we have found a practical means for adjusting the lower end of the downcomer in a vertical direction. We have also discovered a means for adjusting the lower end of the downcomer in a vertical direction which is directly responsive to the varying flow rates. The adjustable means to vertically extend the downcomer comprises a conduit having a diameter either slightly larger than or slightly smaller than the diameter of the downcomer conduit. The vertical movement of the adjustable conduit may be affected by means of a rack and pinion gear device operated either by a manual external handwheel or by a servo motor, or the adjustable conduit may be attached by a cable extending through the downcomer to a suitable float mounted in the upper reaction compartment, said float being responsive to water level changes in the upper reaction compartment. Since the rising level of water in the upper reaction compartment signifies reduced throughput rate while a falling level indicates increased throughput rate, the adjustable conduit located at the lower end of the downcomer provides a means to automatically adjust velocity by either decreasing or increasing the space between the lower edge of the extension conduit and the walls of the tank or conical baffle.

DESCRIPTION OF THE PREFERRED EMBODIMENTS

Figure 1:
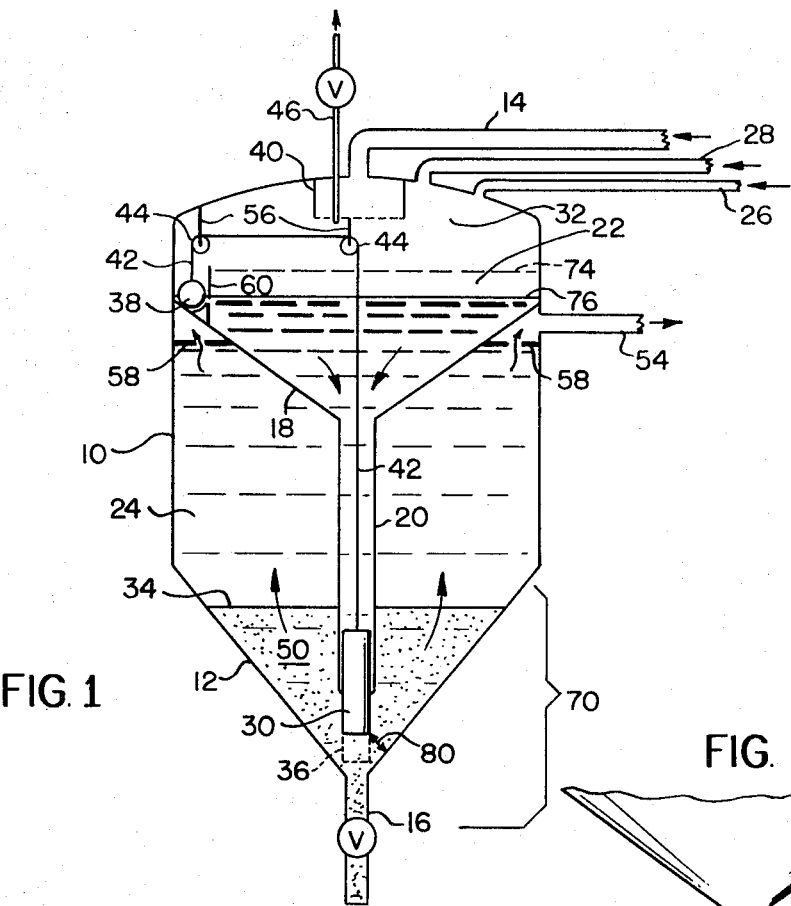
FIG. 1 represents an elevational cross sectional schematic representation of a hot process settling tank having an adjustable downcomer connected to a float in the upper reaction compartment.

The hot process settling tank constructed in accordance with our invention may be characterized by any of the prior art devices which have a funnel-shaped upper reaction compartment communicating with a lower settling compartment having a downcomer or conduit which extends into the apex of a conical configuration. The conical configuration may be a baffle, the walls of the tank, and the like.

In the drawings, numeral 10 represents the outer shell of a tank having a conical-shaped lower portion designated by numeral 12. The tank is divided essentially into two compartments by a conical shaped partition 18 which has the shape of a funnel and defines upper reaction compartment 22 and lower settling compartment 24. Extending from partition 18 is a fixed conduit or downcomer designated by numeral 20. Fixed conduit 20 communicates between upper reaction compartment 22 and lower settling compartment 24. A suitable collecting means is provided in the upper region of the lower settling compartment and is designated as 58. Clarified water exit 54 opens out of collector 58. A raw water inlet, 14, a steam inlet, 28, and a chemical inlet, 26, open into the upper reaction compartment 22. Raw water inlet, 14, opens into raw water distributor head 40 which is located within upper reaction compartment 22. Raw water distributor head 40 provides means for spraying the raw water into upper reaction compartment 22. A suitable vent designated by numeral 46 opens from upper reaction compartment 22 into the atmosphere or other collecting device for the venting of gases, steam and the like. Various test outlets, valves, vents and flow controls (not shown) to control the raw water inlet may be attached to the tank. A sludge removal outlet designated as 16 is located at the vertex or apex of the tank.

In the preferred embodiment as shown in FIG. 1, an adjustable downcomer or movable conduit 30 is provided at the lower end of the fixed conduit or downcomer 20. Movable conduit 30 has a diameter slightly less than the diameter of fixed downcomer 20 or slightly larger than the diameter of fixed downcomer 20. When the diameter of movable conduit 30 is slightly less than the diameter of fixed downcomer 20, then movable conduit 30 may be vertically moved inside fixed downcomer 20. When adjustable downcomer 30 has a diameter larger than fixed downcomer 20, then adjustable downcomer 30 may be vertically moved over the outside of fixed downcomer 20. In the relationship shown in FIG. 1 fixed downcomer 20 fits inside movable conduit 30. Movable conduit 30 is a hollow cylindrical tube and may be flared or tapered at its lower end. Movable conduit 30 is open at both ends.

A cable designated by numeral 42 and extending from the upper reaction compartment longitudinally through the conduit of fixed downcomer 20 may be suitably attached to movable conduit 30 in such a way that when cable 42 moves vertically, movable conduit 30 responds with vertical movement. The other end of cable 42 is attached to a float, designated as downcomer float 38, in upper reaction compartment 22. Downcomer float 38 is located within float guide 60 which prevents the float from responding to water currents and forces other than changes in water level acting within the upper reaction compartment. Downcomer float 38 floats in fluid deposited in upper reaction compartment 22 and responds to the levels of said fluid. The high fluid or water level is designated by numeral 74. The low water or fluid level is designated by numeral 76. The space above the water level is designated as steam space 32. Cable 42 is guided by at least two sheaves or pulleys designated by numeral 44 located in upper reaction compartment 22. The sheaves are supported by attachment to the tank or other members within said tank by sheave support 56. One of the sheaves is mounted above downcomer float 38 and the other sheave is mounted above the core or conduit of fixed downcomer 20. As used herein sheaves are defined as any wheel, grooved wheel, pulley, sprocket wheel and the like. In the operation of the hot process settling tank, raw water is injected at raw water inlet 14, steam is injected at steam inlet 28 and chemicals are injected at chemical inlet 26 into upper reaction compartment 22. The steam in steam space 32 heats the raw water spray which is distributed by raw water distributor head 40. The water collects in the upper reaction compartment 22 and chemicals from chemical inlet 26 are mixed with said water. Precipitants resulting from the reaction of the hardness ions in the raw water and the injected chemicals begin to form in the upper reaction compartment and flow from upper reaction compartment 22 through fixed downcomer 20, through movable conduit 30 into the lower conical portion of tank 10. The precipitants settle out in the conical portion 12 of tank 10 and form a sludge blanket which is designated by numeral 50. As the precipitants continue to enter conical portion 12 they collect in sludge blanket 50 while the water continues an upflow path into the upper portions of the lower settling compartment 24, into collector 58 and exit from the tank through clarified water exit 54. Upflow zone 70 is that area of the lower settling compartment 24 were water exits from the movable conduit into the cone portion 12 and flows toward the upper portion of the lower settling compartment 24. The upper level of sludge blanket 50 which collects in the lower conical portion 12 of the tank is designated by numeral 34. Sludge may be periodically removed from sludge removal outlet 16 located at the apex of the tank.

Movable conduit 30 attached to downcomer float 38 by means of cable 42 is in a raised or elevated position when the float is at lower water level 76. When the water is at high water level 74, movable conduit 30 is in a lower position or a position in which the distance between the downcomer and the conical wall 12, designated by numeral 80, is smaller. When the movable conduit 30 is in the elevated position, that is, when downcomer float 38 is at low water level 76, then distance 80, the distance between the downcomer and the conical portion 12, is greater. Dotted line 36 indicates the position occupied by the extended or lowered movable conduit 30.

Figure 2:
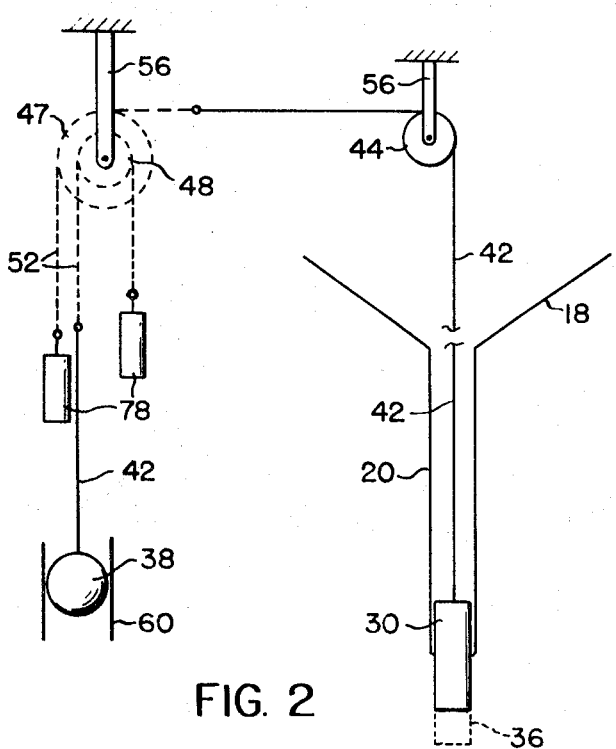
FIG. 2 is a schematic representation of an adjustable downcomer connected to a float mechanism having sheaves and counterweights to magnify or reduce the movement of the adjustable downcomer.

In a hot process settling tank having a movable conduit, when the relative vertical movements of the water level and the movable conduit are not proportional to each other, that is, when a maximum change in water level is reflected by slight vertical movement of the movable conduit, or vice versa, an arrangement of the sheaves can be used either to magnify or reduce the one motion with respect to the other. This arrangement is shown in FIG. 2 wherein motion of downcomer float 38 is magnified in the vertical movement of movable conduit 30. This is accomplished by mounting a pair of sprocket wheels designated by numeral 47 and 48 above downcomer float 38 by means of sprocket wheel support 56. The pair of sprocket wheels is arranged in such a manner that a smaller sprocket wheel, 48, is fixedly mounted to a larger sprocket wheel, 47, whereby both sprocket wheels have a single shaft.

When smaller sprocket wheel 48 rotates, larger sprocket wheel 47 also rotates. In the schematic of FIG. 2 which illustrates magnification of the motion of the downcomer float 38, the cable attached to downcomer float 38 is attached to smaller sprocket wheel 48 by means of a sprocket chain, 52. Cable 42 which is attached to movable conduit 30 is guided by the larger sprocket wheel, 47, by means of a sprocket chain designated as 52. The sprocket wheels and sprocket chains may be replaced by other suitable friction devices which will not slip on the concentric wheels designated as 47 and 48. In order to provide stability to this system, counterweights designated as 78 are attached to the end of cable 42 opposite the movable conduit 30 and to the end of cable 42 opposite downcomer float 38. In this arrangement motion of the smaller wheel 48 is magnified by the rotation of larger wheel 47. In order to minimize or diminish movable conduit vertical movement the float cable of FIG. 2 may be attached to larger wheel 47 and the movable conduit cable may be attached to smaller wheel 48. The sizes of the sprocket wheel must be determined by such factors as size of the tank, response of the float to changing water levels and the like. In FIG. 2 sheave 44 and sheave or sprocket wheel supports 56 serve the same purpose as those discussed in FIG. 1.

Figure 3:
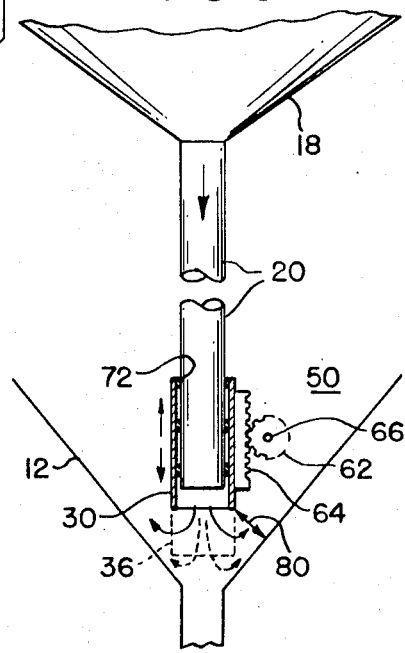
FIG. 3 represents an elevational cross-sectional schematic view of an adjustable downcomer which may be moved by means of a rack and pinion gear.

In another embodiment of this invention as shown in FIG. 3, movable conduit 30 may be vertically moved by means of a rack and pinion gear. In FIG. 3, rack 64 is fixedly mounted to movable conduit 30. A pinion gear, 62, on shaft or stem 66 is rotatably mounted so that the teeth of pinion gear 62 mate with the teeth of rack 64. Rotation of shaft 66 will cause vertical motion of movable conduit 30 and thereby increase or decrease distance 80 between the movable conduit and the conical portion 12. Dotted line 36 shows the position of the extended downcomer. Although it is not shown, shaft 66 may be rotated by a stem arrangement passing through conical member 12 to the outside of the tank. Shaft 66 may be rotated manually by an external hand wheel, or it may be rotated by means of a servo motor (not shown) responsive to sensor devices actuated by water levels (not shown) in upper reaction compartment 22. Movable conduit 30 being a conduit of slightly smaller or slightly larger diameter of fixed downcomer 20 may be separated from the fixed downcomer 20 by small fixed bushings shown in FIG. 3 as downcomer guides 72. Downcomer guides 72 provide a means for preventing the walls of the movable conduit from binding against the walls of the fixed downcomer. The downcomer guides may be made of any suitable material such as plastic, metal and the like.

It should be noted that the shape of the outside of the tank is unimportant in the practice of this invention. The tank may be cylindrical spherical and the like. However, the downcomer must extend into a conical area in the lower settling compartment and if the walls of the particular tank form said conical area, then the walls must necessarily assume a conical shape in the lower regions of the tank.

It is to be understood that the hot process settling tank of this invention may incorporate a sludge concentration pocket (not shown) in the area of the sludge blanket. A sludge concentration pocket is a receptacle or container in the lower part of the reaction vessel which produces a quiescent zone where the sludge can accumulate and settle for subsequent removal from the vessel without disturbing the water softening process.

By this invention, we have produced an ideal apparatus and method for maintaining the balance between sludge blanket thickness and adequate concentration of sludge for removal. This has been accomplished by providing a downcomer, the lower end of which is adjustable vertically to correspond to varying flow rate even in view of the fact that the downcomer is large in size and that the interior of the tank is generally under pressure. This invention also provides for proper sludge blanket action at different flows and for different sludge blanket consistencies. Accordingly, by this invention when the water level in the upper reaction compartment becomes low, the downcomer is shortened causing an increased distance between the end of the downcomer and the upwardly diverging wall. This in turn causes a decrease in water velocity in the space 80 and thereby maintains the thickness and consistency of the sludge blanket at the desired amounts. Wen the water level rises in the upper reaction compartment, the downcomer is lengthened causing a decreased distance between the end of the downcomer and the upwardly diverging wall. This causes an increase in the velocity in the space 80 and thereby again maintains the thickness and consistency of the sludge blanket at the desired amounts. This invention has provided means for automatically adjusting the downcomer by means responsive to water level changes in the upper reaction compartment or for manually adjusting the downcomer by means controlled by the operator. It is considered within the scope of this invention to combine automatic and manual means for adjusting the length of the downcomer.

It is to be understood that although the invention has been described with specific reference to particular embodiments thereof, it is not to be so limited since changes and alterations therein may be made which are within the full intended scope of this invention as defined by the appended claims.

We claim:

1. A hot process water softener for removing precipitants from chemically treated water comprising:
   a. a tank having a partition which separates said tank into an upper reaction compartment and a lower settling compartment, said lower settling compartment having an upwardly diverging wall defining an upflow zone of increasing cross-sectional area;
   b. a downcomer depending from said partition for discharging said chemically treated water from the upper reaction compartment into the area of the lower settling compartment defined by said upwardly diverging wall;
   c. means for vertically regulating the length of said downcomer to provide control of the velocities of said chemically treated water passing from the upper reaction compartment to the lower reaction compartment;
   d. means for collecting clarified water from the upper regions of the lower settling compartment, said water emerging in an upflow pattern from the lower region of said lower settling compartment defined by said upwardly diverging walls; and
   e. means for removal of precipitants from the lower regions of said lower settling compartment whereby the precipitants form a sludge blanket which collects in said area of the lower settling compartment defined by said upwardly diverging walls and the thickness and consistency of said sludge blanket is maintained substantially uniform by vertically regulating the length of said downcomer.

2. The hot process water softener of claim 1 wherein the means for vertically regulating the length of said downcomer comprises:
   a. a movable conduit slidably mounted at the lower end of said downcomer;
   b. a float mounted in a float guide in the upper reaction compartment, said float being responsive to fluid level changes in said upper reaction compartment;
   c. at least two sheaves, one being mounted above said float and one being mounted above the core of said downcomer; and
   d. connecting means passing longitudinally through said downcomer and guided by said sheaves, said connecting means joining said float and said movable conduit whereby said movable conduit moves vertically to adjust the length of said downcomer in response to fluid level changes in said upper reaction compartment.

3. The hot process water softener of claim 2 wherein the sheave mounted above said float comprises at least two sprocket wheels, one of said sprocket wheels having a smaller diameter than the other, said sprocket wheel of smaller diameter supporting connecting means between said float and a first counterweight and the other sprocket wheel of larger diameter supporting connecting means between the movable conduit and a second counterweight, said sprocket wheel of larger diameter rotatably responding to rotation of said sprocket wheel of smaller diameter, whereby said sprocket wheel of larger diameter rotates when said sprocket wheel of smaller diameter rotates in response to vertical motion of said float, thereby causing magnification of the vertical movement of said movable conduit.

4. The hot process water softener of claim 2 wherein the sheave mounted above said first float comprises at least two sprocket wheels, one of said sprocket wheels having a smaller diameter than the other, said sprocket wheel of smaller diameter supporting connecting means between said movable conduit and a first counterweight and the other sprocket wheel of larger diameter supporting connecting means between said float and a second counterweight, said sprocket wheel of smaller diameter rotatably responding to rotation of said sprocket wheel of larger diameter, whereby said sprocket wheel of smaller diameter rotates when said sprocket wheel of larger diameter rotates in response to vertical motion of said float, thereby causing diminished vertical movement of said movable conduit.

5. The hot process water softener of claim 1 wherein the means for vertically regulating the length of said downcomer comprises:
   a. a movable conduit slidably mounted at the lower end of said downcomer said movable conduit having a rack fixedly mounted thereon; and
   b. a pinion gear having a shaft extending through the walls of said tank shaft said shaft rotatably mounted within said tank to provide for the free movement of said pinion gear, the teeth of said pinion gear mating with the teeth of said rack, whereby rotation of said shaft causes the vertical movement of said movable conduit thereby adjusting the distance between the downcomer and the upwardly diverging wall.

6. In a hot process settling tank having an upper reaction compartment and a lower settling compartment, said upper reaction compartment having a raw water inlet, means for adding water-treating chemicals to the raw water, means therein to heat said raw water, the chemicals reacting with the impurities in the heated raw water to produce treated water and precipitates, a downcomer extending from the upper reaction compartment into the lower settling compartment, said lower settling compartment having an upwardly diverging wall within the lower portion thereof, said upwardly diverging wall defining an upflow zone wherein a sludge blanket formed from accumulating precipitates collect, a sludge removal outlet in the lower portion of the lower settling compartment, and collector means for the removal of clarified water from the upper region of the lower settling compartment, the improvement comprising a movable conduit extending from the lower end of said downcomer into the area of the upwardly diverging wall in the lower settling compartment, said movable conduit being slidably mounted at the lower end of said downcomer and means for vertically moving said movable conduit.

7. The hot process settling tank of claim 6 wherein said movable conduit is connected by means of a cable to a float mounted in a float guide in the upper reaction compartment, said float being responsive to fluid level changes in said upper reaction compartment, said cable guided by at least two sheaves one of which is mounted above said float and the other of which is mounted above the core of said downcomer, whereby said movable conduit moves vertically downward when said float rises vertically in said float guide thereby decreasing the distance between the downcomer and the upwardly diverging wall, and said movable conduit moves vertically upward when said float descends vertically in said float guide thereby increasing the distance between the downcomer and the upwardly diverging wall.

8. The hot process settling tank of claim 7 wherein the sheave mounted above said float comprises at least two sprocket wheels, one of said sprocket wheels having a smaller diameter than the other, said sprocket wheel of smaller diameter supporting connecting means between said float and a first counterweight and the other sprocket wheel of larger diameter rotatably responding to rotation of said sprocket wheel of smaller diameter, whereby said sprocket wheel of larger diameter supporting connecting means between the movable conduit and a second counterweight, said sprocket wheel of layer diameter rotatably responding to rotation of said sprocket wheel of smaller diameter, whereby said sprocket wheel of larger diameter rotates when said sprocket wheel of smaller diameter rotates in response to vertical motion of said float, thereby causing magnification of the vertical movement of said movable conduit.

9. The hot process settling tank of claim 7 wherein the sheave mounted above said float comprises at least two sprocket wheels, one of said sprocket wheels having a smaller diameter than the other, said sprocket wheel of smaller diameter supporting connecting means between said movable conduit and a first counterweight and the other sprocket wheel of larger diameter supporting connecting means between said float and a second counterweight, said sprocket wheel of smaller diameter rotatably responding to rotation of said sprocket wheel of larger diameter, whereby said sprocket wheel of smaller diameter rotates when said sprocket wheel of larger diameter rotates in response to vertical motion of said float, thereby causing diminished vertical movement of said movable conduit.

10. The hot process water softener of claim 6 wherein the movable conduit is moved vertically upward and downward by means of a rack and pinion gear, said rack being fixedly mounted on said movable conduit and said pinion gear having a shaft rotatably mounted to the walls of said tank and extending from said pinion gear through said wall external to said tank, the teeth of said pinion gear mating with the teeth of said rack, whereby rotation of said shaft induces vertical movement of said movable conduit thereby causing a change in the distance between the downcomer and the upwardly diverging wall.

11. In a process for treating water in a hot process water softener wherein heated water and chemicals are mixed and form a precipitant in an upper reaction compartment, said water and precipitant passing to a lower settling compartment where the precipitant settles out in the form of a sludge blanket and the treated water exits from said lower settling compartment after it passes through said sludge blanket, the improvement comprising adjusting the velocity of water flowing from the upper reaction compartment to the lower settling compartment by movable conduit means located in the lower settling compartment, said movable conduit regulating the distance between the conduit and the walls of the lower settling compartment whereby the sludge blanket remains uniformly suspended in the lower settling compartment when water level changes occur in the upper reaction compartment.

12. The process in accordance with claim 11 wherein the adjustment of the velocity of water from the upper reaction compartment to the lower settling compartment is responsive to water level changes in said upper reaction compartment.

* * * * *